United States Patent
Kataoka et al.

[11] Patent Number: 5,859,365
[45] Date of Patent: Jan. 12, 1999

[54] REMAINING FUEL AMOUNT MEASURING APPARATUS FOR A FUEL TANK

[75] Inventors: Ichiro Kataoka; Kazuyuki Sasaki; Kunimitsu Aoki; Shozo Ashizawa; Shinji Narama; Takaaki Itou, all of Shizuoka; Toru Kidokoro, Kanagawa; Yoshihiko Hyodo, Shizuoka, all of Japan

[73] Assignees: Yazaki Corporation, Tokyo; Toyota Jidosha Kabushiki Kaisha, Aichi, both of Japan

[21] Appl. No.: 839,595

[22] Filed: Apr. 15, 1997

[30] Foreign Application Priority Data

Apr. 16, 1996 [JP] Japan .................................. 8-094106

[51] Int. Cl.⁶ ........................................................ G01F 17/00
[52] U.S. Cl. ............................................................. 73/149
[58] Field of Search .................................... 73/149, 290 B

[56] References Cited

U.S. PATENT DOCUMENTS

| | | | |
|---|---|---|---|
| 1,508,969 | 9/1924 | Guichard | 73/290 B |
| 3,617,034 | 11/1971 | Skinner et al. | 261/22 |
| 3,701,540 | 10/1972 | Pringle | 280/5 A |
| 4,770,033 | 9/1988 | Nicolai | 73/290 B |
| 4,984,457 | 1/1991 | Morris | 73/149 |
| 5,315,867 | 5/1994 | Hartel et al. | 73/149 |

FOREIGN PATENT DOCUMENTS

| | | |
|---|---|---|
| 56-128221 | 10/1981 | Japan . |
| 60-157427 | 10/1985 | Japan . |
| 60-158922 | 10/1985 | Japan . |
| 61-235727 | 10/1986 | Japan . |
| 64-16426 | 1/1989 | Japan . |
| 3-144315 | 6/1991 | Japan . |
| 7-132738 | 5/1995 | Japan . |

*Primary Examiner*—Robert Raevis
*Attorney, Agent, or Firm*—Sughrue, Mion, Zinn, Macpeak & Seas, PLLC

[57] ABSTRACT

In a remaining fuel amount measuring apparatus for a fuel tank which is suited to the fuel tank designed to suppress generation of fuel vapor, a CPU actuates a piston to supply a prescribed amount of air into a pressure adjusting chamber, thereby increasing the pressure within the pressure adjusting chamber. From the Boyle's law, the increasing rate of air before air supply is inversely proportional to the volume V of the pressure adjusting chamber. Therefore, the CPU, referring to the pressure within the pressure adjusting chamber before and after the air supply, acquires the volume V of the pressure adjusting chamber, and subtracts the volume V of the pressure adjusting chamber from the internal volume of a tank body to acquire the volume of a fuel chamber, i.e. remaining fuel amount.

14 Claims, 12 Drawing Sheets

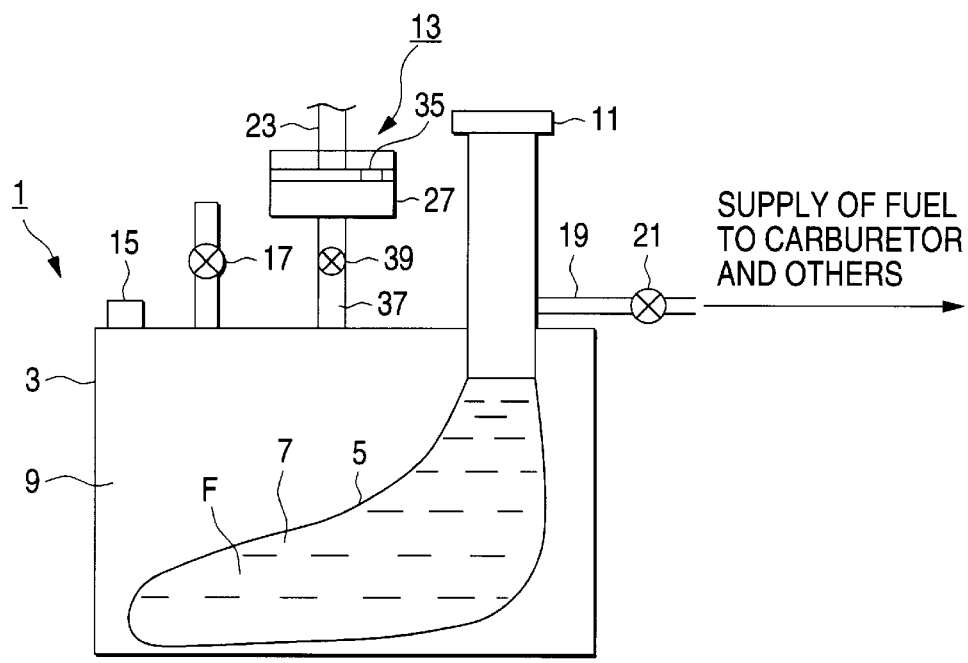
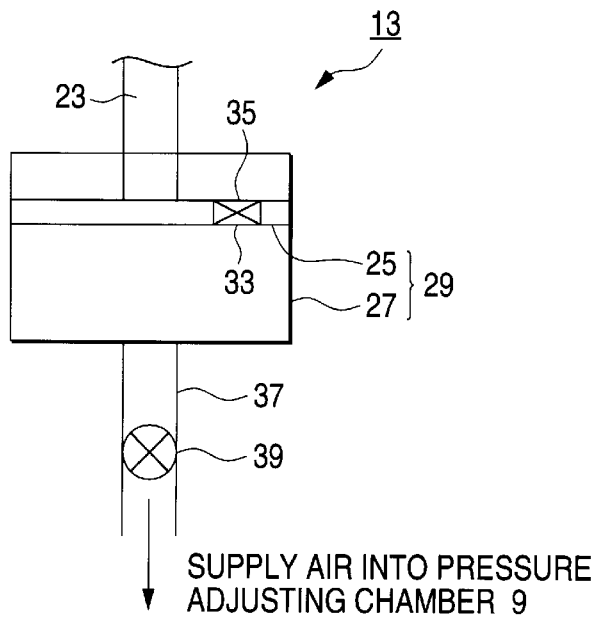

REMAINING FUEL AMOUNT MEASURING APPARATUS FOR A FUEL TANK

BACKGROUND OF THE INVENTION

The present invention relates to an apparatus for measuring the amount of fuel remaining in a fuel tank of a motor vehicle equipped with an internal combustion engine, and more particularly to a remaining fuel amount measuring apparatus which is suited for the fuel tank designed to suppress generation of fuel vapor.

Generally, the motor vehicle equipped with an internal combustion engine includes a fuel tank. Reflecting the rising in consciousness of environmental conservation of earth in recent years, some fuel tanks have been proposed which are designed to suppress fuel vapor from dispersing into the atmosphere.

The fuel tank, as disclosed in Japanese Patent Unexamined Publication No. Sho 56-128221, includes an inside space of a tank body sectioned into a fuel chamber containing fuel and a pressure adjusting chamber communicating with the atmosphere by a shielding member so that the fuel stored in the fuel chamber is separated from contact with the atmosphere, thereby suppressing fuel vapor from generating.

The fuel tank generally includes a remaining fuel amount measuring apparatus for measuring the amount of fuel remaining in the tank. The above Japanese Patent Unexamined Publication No. sho 56-128221 describes an example of the application of a conventional remaining fuel amount measuring apparatus to a fuel tank designed to suppress the generation of fuel vapor. This remaining fuel amount measuring apparatus includes a shielding member which moves vertically in accordance with the vertical movement of a fuel liquid surface, a swinging rod which is provided with a roller in contact with the upper surface of the shielding member at the tip thereof and swings in accordance with the vertical movement of the fuel liquid surface as a fulcrum of a rod shaft provided on the upper side of the fuel tank. The fuel tank further includes a wiring resistor and a contact arm which is coupled with the swinging rod and slides on the wiring resistor at a fulcrum of the rod shaft. The remaining fuel amount measuring apparatus detects the position of the shielding member, i.e., fuel liquid surface in terms of an electric resistance of the wiring resistor. The detected liquid amount is indicated on a fuel meter located in a vehicle chamber so that a driver can know the remaining fuel amount by an indication on the fuel meter.

However, the above conventional remaining fuel amount measuring apparatus has a problem that the remaining fuel amount may be erroneously indicated on the fuel meter because of a change in a vehicle profile due to acceleration/deceleration and vibration of the vehicle, tilt of road, etc.

The reason is as follows. The surface of fuel liquid contained in the fuel tank largely swings in response to the change in the vehicle profile. This is attended with the vertical movement of the shielding member. Accordingly, the electric resistance of the wiring resistor indicative of the liquid amount changes.

In order to obviate such an inconvenience, some techniques of retarding the response of an indicator of a fuel meter have been proposed which include provision of a silicon damper with high viscosity at an indicator driving section of the fuel meter and of successively integrating the input electric resistance in converting the electric resistance into a remaining fuel amount to acquire the fuel amount on the basis of the integrated value of the electric resistance in a prescribed time.

However, retarding the response of the indicator of the fuel meter by using these techniques gives rise to a new problem of impairing the response of the indicator of the fuel meter, for example, a time is required for the indicator of the meter to indicate a correct indicated value at the time of full supply of fuel.

Further, the conventional remaining fuel amount measuring apparatus obtains an electric resistance which is a base of the measurement of the fuel amount by sliding a contact arm on a wiring resistance. However, poor contact between the wiring resistance and contact arm leads to an electric resistance not corresponding to a correct remaining fuel amount. This may make it impossible to measure the fuel amount at high accuracy for a long term.

The conventional remaining fuel amount measuring apparatus inherently having these plural problems is not preferably applied to the fuel tank designed to suppress the production of fuel vapor. Therefore, development of a new remaining fuel amount measuring apparatus suited to this kind of fuel tank has been demanded eagerly.

SUMMARY OF THE INVENTION

The present invention has been accomplished in view of the above circumstance and intends to provide a remaining fuel amount measuring apparatus suited to a fuel tank designed to suppress the production of fuel vapor.

Also, the present invention intends to provide a remaining fuel amount measuring apparatus which can measure the amount of fuel remaining in a fuel tank with quick response and high accuracy for a long term.

In order to solve the above problem, the invention of a first aspect provides an apparatus for measuring the amount of fuel remaining in a fuel tank having a tank body which partitions the internal space of the fuel tank into a fuel chamber accommodating the fuel and a pressure adjusting chamber communicating with the atmosphere, the apparatus measuring the fuel amount in the fuel chamber and comprising: parameter detecting means for detecting a parameter relative to air existing in said pressure adjusting chamber; and calculating means for calculating the remaining fuel amount in said fuel chamber on the basis of the parameter relative to the air detected by the parameter detecting means.

In the invention of the first aspect, the calculating means calculates the fuel amount in said fuel chamber on the basis of the parameter relative to the air detected by the parameter detecting means. In the prior art, the liquid face of fuel remaining in the fuel tank is detected by a float and the detected value is converted into a remaining fuel amount. On the other hand, in place of this, in accordance with the invention of the first aspect, the fuel amount is acquired on the basis of the parameter relative to the air which is not affected by the swing of the liquid face of the fuel. Therefore, the value thus obtained, which is not affected by external disturbance such as a change in the posture of a vehicle, correctly represents the fuel amount in the fuel tank.

Therefore, the error of the fuel amount due to the posture of the fuel tank, which was generated conventionally, can be removed. In addition, giving a delay to the detected value of the fuel liquid face in order to remove the error of the fuel amount conventionally generated is not required. Further, since the fuel amount is detected regardless of the electric resistance generated by the electric contact between a wiring resistor and a contact arm, the fuel amount in the fuel tank can be measured with quick response and high accuracy for a long term.

The invention of a second aspect provides an apparatus for measuring the amount of fuel remaining in a fuel tank having a tank body which partitions the internal space of the fuel tank into a fuel chamber accommodating the fuel and a pressure adjusting chamber communicating with the atmosphere, the apparatus measuring the fuel amount in the fuel chamber and comprising: sealing means for sealing the outflow of air from said tank body; air supply means for supplying a required amount of air into said pressure adjusting chamber in a state where the outflow of air is sealed by said sealing means; pressure detecting means for detecting the pressures within said pressure adjusting chamber before and after air supply by said air supply means, respectively; pressure storage means for storing the detected pressure values within said pressure adjusting chamber before and after air supply by said pressure detecting means; air amount calculating means for reading said detected pressure values from said pressure storage means to calculate an air amount on the basis of said detected pressure values and said required air amount; and fuel amount estimating means for estimating the remaining fuel amount in said fuel chamber on the basis of the air amount calculated by said air amount calculating means.

In the invention of the second aspect, the air supply means supplies the required amount of air into said pressure adjusting chamber in a state where the outflow of air is sealed by said sealing means. The pressure detecting means detects the pressures within said pressure adjusting chamber before and after air supply, respectively. The pressure storage means stores the detected pressure values within said pressure adjusting chamber before and after air supply by said pressure detecting means. The air amount calculating means reads said detected pressure values from said pressure storage means to calculate the air amount on the basis of said detected pressure values and said required air amount. The fuel amount estimating means estimates the fuel amount in said fuel chamber on the basis of the air amount calculated by said air amount calculating means. In the prior art, the liquid face of fuel remaining in the fuel tank is detected by a float and the detected value is converted into a remaining fuel amount. On the other hand, in place of this, in accordance with the invention of the second aspect, the fuel amount is acquired on the basis of the amount of air in the pressure adjusting chamber which is not affected by the swing of the liquid face of the fuel. Therefore, the value thus obtained, which is not affected by external disturbance such as a change in the posture of a vehicle, correctly reproduces the fuel amount in the fuel tank.

Therefore, the error of the fuel amount due to the posture of the fuel tank, which was generated conventionally, can be removed. In addition, giving a delay to the detected value of the fuel liquid face in order to remove the error of the fuel amount conventionally generated is not required. Further, since the fuel amount is detected regardless of the electric resistance generated by the electric contact between a wiring resistor and a contact arm, the fuel amount in the fuel tank can be measured with quick response and high accuracy for a long term.

The invention of a third aspect provides an apparatus for measuring the amount of fuel remaining in a fuel tank having a tank body which partitions the internal space of the fuel tank into a fuel chamber accommodating fuel and a pressure adjusting chamber communicating with the atmosphere, the apparatus measuring the fuel amount in the fuel chamber and comprising: air amount storage means for storing the amount of air existing in the pressure adjusting chamber at a reference time when a prescribed amount of fuel remains within said fuel chamber; air outflow amount detecting means accumulatively detecting the amount of air flowed out from said tank body since the reference time; air inflow amount detecting means for accumulatively detecting the amount of air flowed into said tank body since the reference time; inflow/outflow amount storage means for storing the inflow/outflow amounts of air detected by said air outflow amount detecting means and said air inflow amount detecting means; air amount calculating means for reading said air amount from said air amount storage means and said inflow/outflow amounts of air from said inflow/outflow amount storage means to calculate the amount of air existing in said pressure adjusting chamber on the basis of said air amount and said inflow/outflow amounts of air; and remaining fuel estimating means for estimating the remaining fuel amount in said fuel chamber on the basis of the air amount calculated by said air amount calculating means.

In the invention of the third aspect, first, the air outflow amount detecting means accumulatively detects the amount of air flowed out from said tank body since said reference time such as a filling-up time whereas the air inflow amount detecting means accumulatively detects the amount of air flowed into said tank body since the reference time. The inflow/outflow amount storage means stores the inflow/outflow amounts of air detected by said air outflow amount detecting means and said air inflow amount detecting means. The air amount calculating means reads said air amount from said air amount storage means and said inflow/outflow amounts of air from said inflow/outflow amount storage means to calculate the air amount existing in said pressure adjusting chamber on the basis of said air amount and said inflow/outflow amounts of air. The fuel amount estimating means estimates the remaining fuel amount in said fuel chamber on the basis of the air amount calculated by said air amount calculating means. In the prior art, the liquid face of fuel remaining in the fuel tank is detected by a float and the detected value is converted into a remaining fuel amount. On the other hand, in place of this, in accordance with the invention of the third aspect, as in the invention of the second aspect, the fuel amount is acquired on the basis of the volume of air in the pressure adjusting chamber which is not affected by the swing of the liquid face of the fuel. Therefore, the value thus obtained, which is not affected by external disturbance such as a change in the posture of a vehicle, correctly represents the fuel amount in the fuel tank.

Therefore, the error of the fuel amount due to the posture of the fuel tank, which was generated conventionally, can be removed. In addition, giving a delay to the detected value of the fuel liquid face in order to remove the error of the fuel amount conventionally generated is not required. Further, since the fuel amount is detected regardless of the electric resistance generated by the electric contact between a wiring resistor and a contact arm, the fuel amount in the fuel tank can be measured with quick response and high accuracy for a long term.

The invention of a fourth aspect further comprises: temperature detecting means for detecting an environmental temperature within said pressure adjusting chamber; and correcting means for correcting the calculated result of said air amount calculating means on the basis of the environmental temperature within said pressure chamber detected by said temperature detecting means.

In the invention of the fourth aspect, the correcting means corrects the calculated result of said air amount calculating means on the basis of the environmental temperature within said pressure chamber detected by said temperature detecting means. Thus, even when the environmental temperature within the pressure adjusting chamber changes, the correcting means makes correction of excluding the variation in the air flowed in/out attendant on the temperature change from the amount of air in the pressure adjusting chamber so that the variation of the air amount of the pressure adjusting chamber due to the change in the environmental temperature in the pressure adjusting chamber is canceled, thus acquiring the fuel amount with high accuracy.

BRIEF DESCRIPTION OF THE DRAWINGS

FIG. 1 is a block diagram of the fuel amount measuring apparatus for a fuel tank according to a first embodiment of the present invention.

FIG. 2 is a partially enlarged view of the first embodiment.

DETAILED DESCRIPTION OF THE INVENTION

Figure 3:
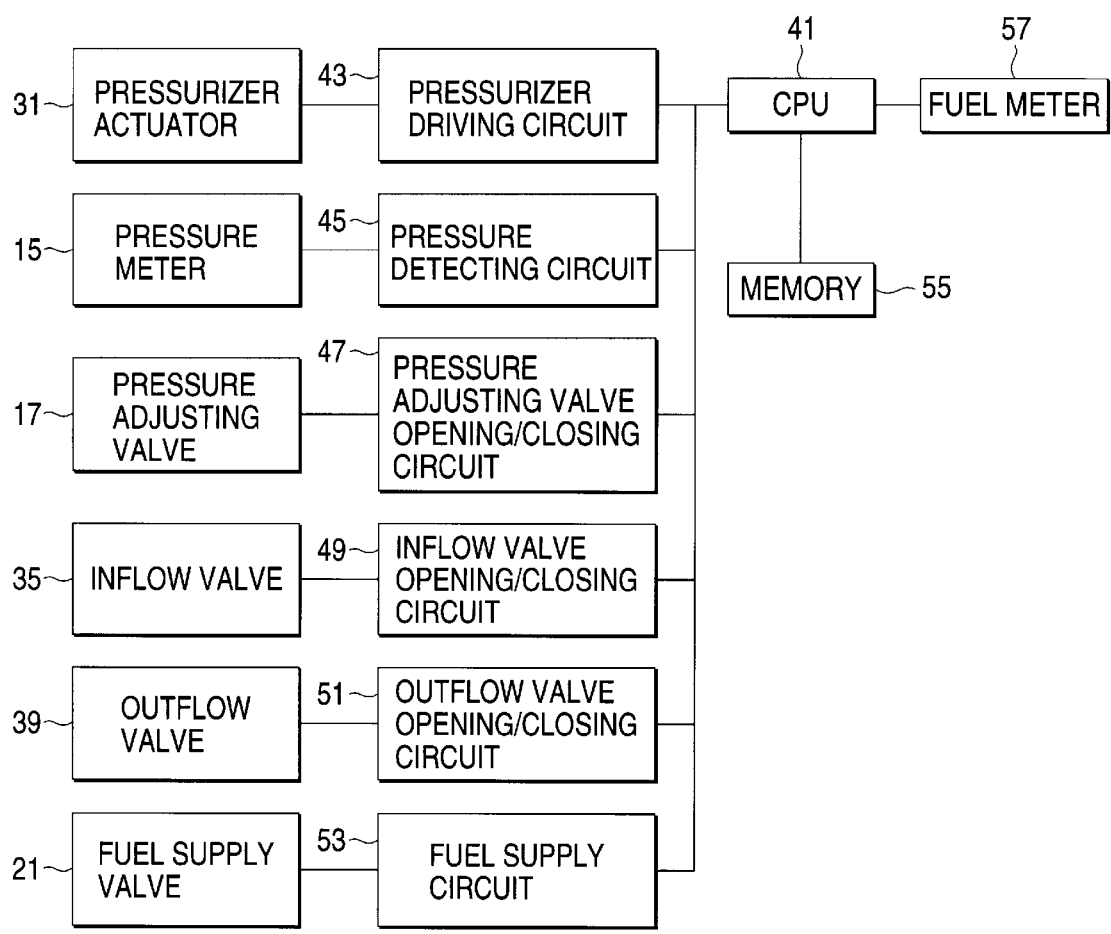
FIG. 3 is a block diagram showing a controller in the first embodiment of the present invention.

Now referring to the drawings, plural embodiments of remaining fuel amount measuring apparatus for a fuel tank according to the present invention will be described, in which the fuel tank is used for a motor vehicle equipped with an internal combustion engine.

Figure 4:
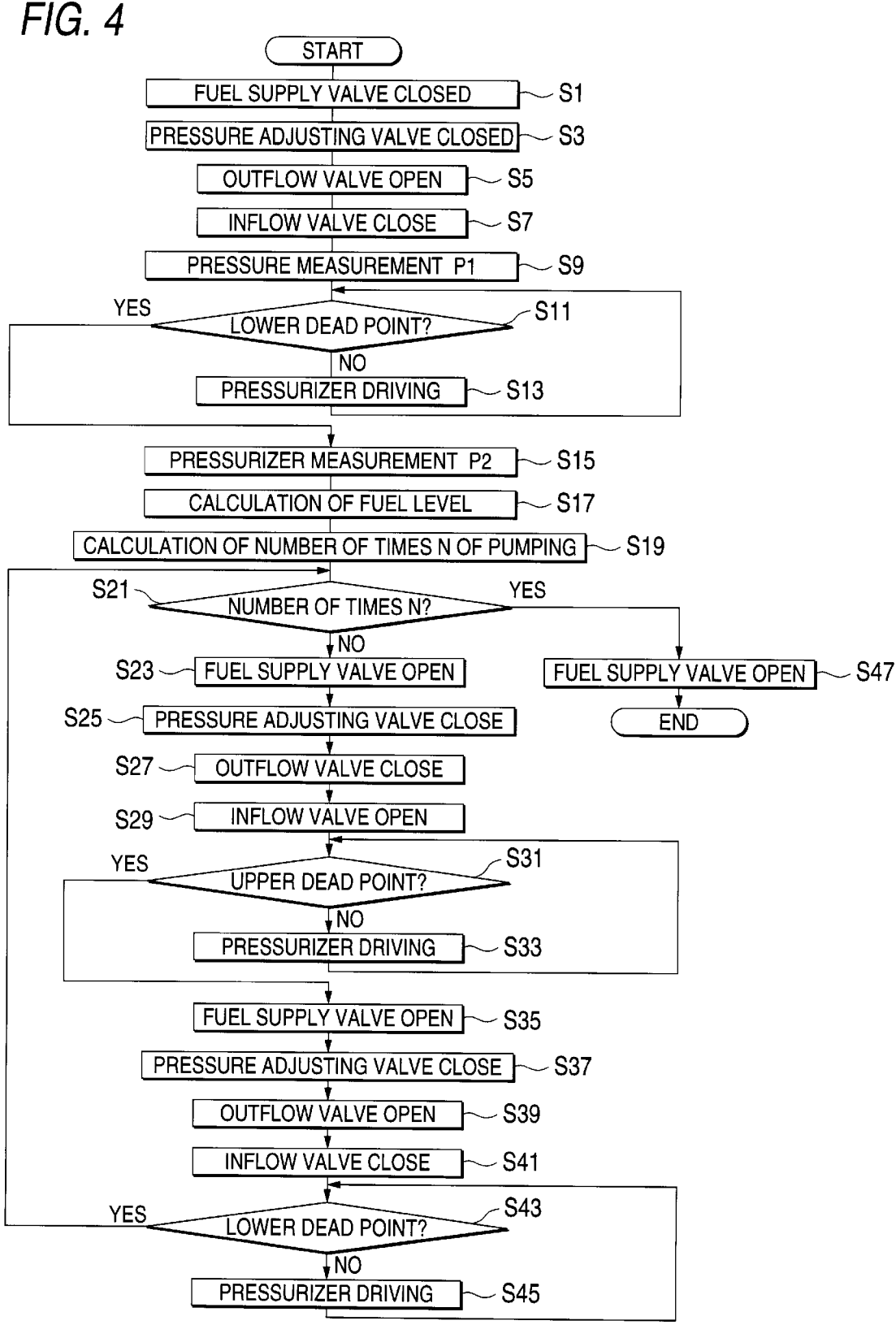
FIG. 4 is a flowchart for explaining the operation in the first embodiment.
Figure 5:
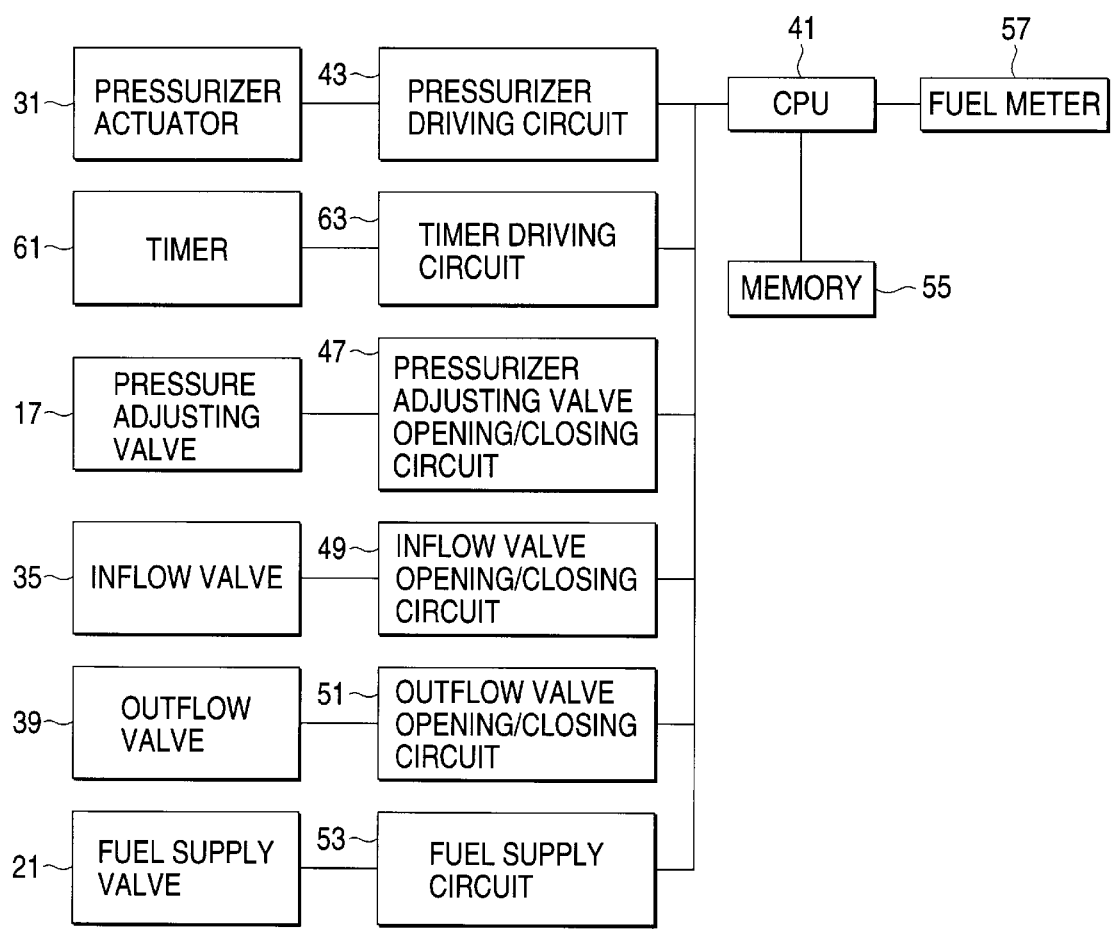
FIG. 5 is a block diagram showing a controller in a second embodiment of the present invention.
Figure 6:
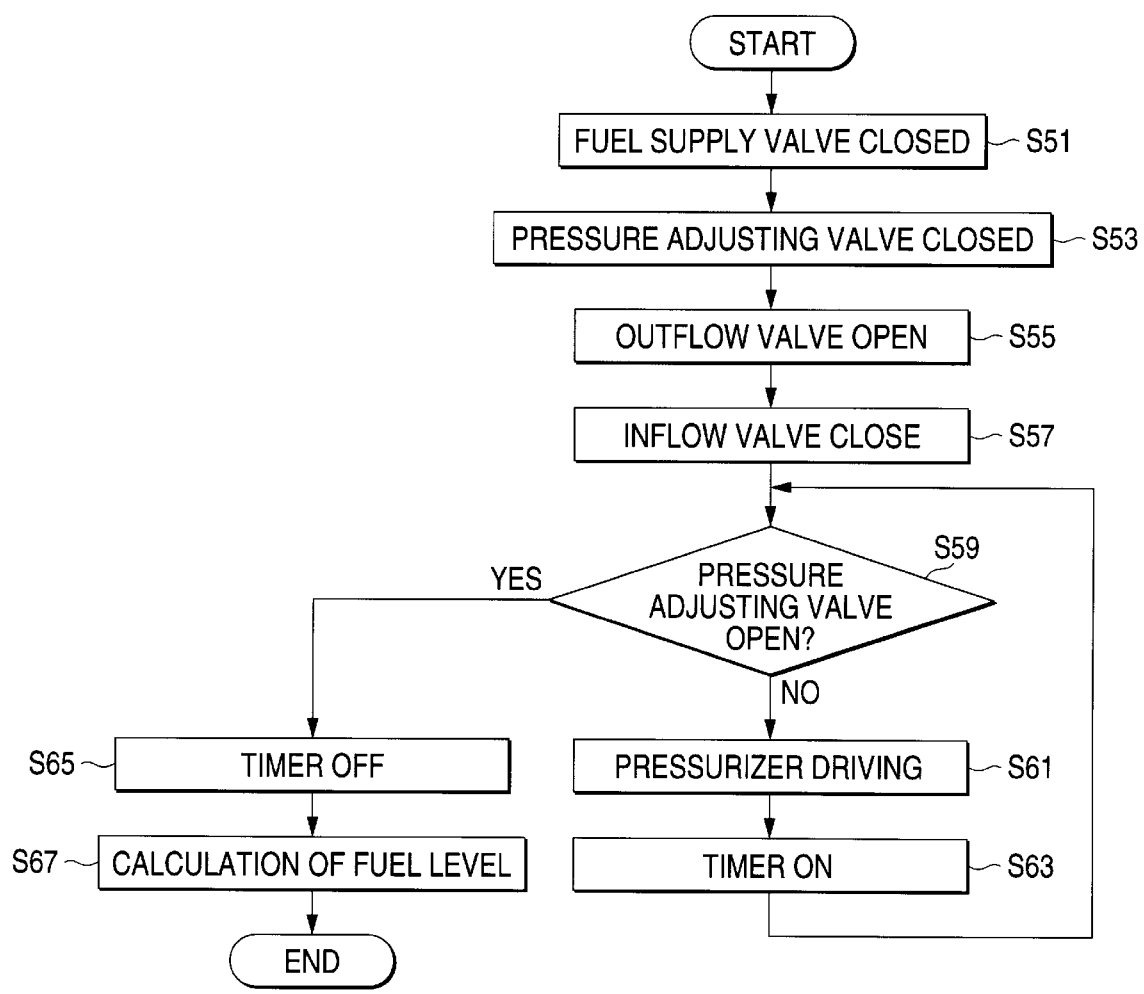
FIG. 6 is a flowchart for explaining the operation in the second embodiment.
Figure 7:
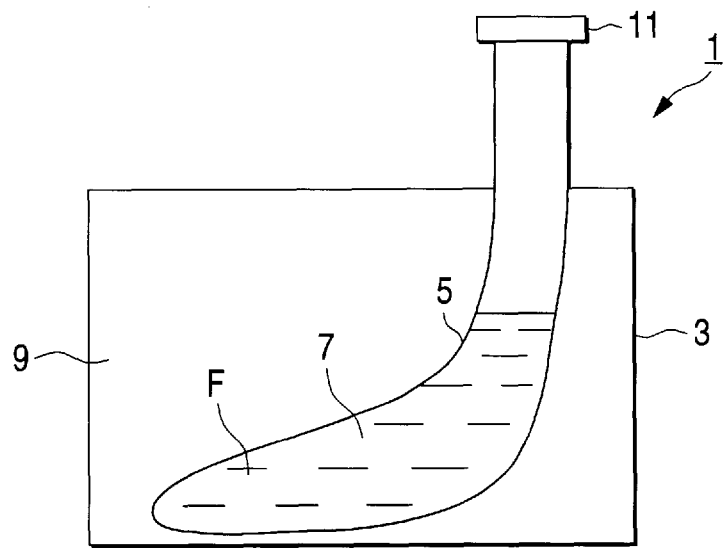
FIG. 7 is a schematic view for explaining the fuel tank according to the present invention.
Figure 8:
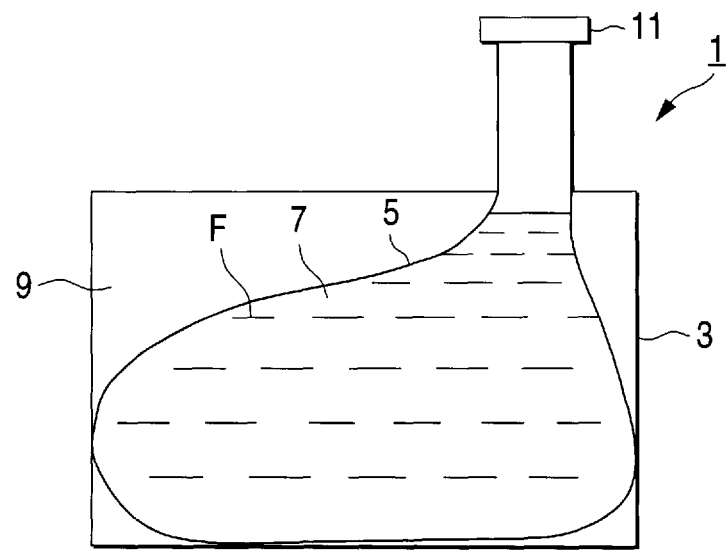
FIG. 8 is a schematic view for explaining the fuel tank according to the present invention.
Figure 9:
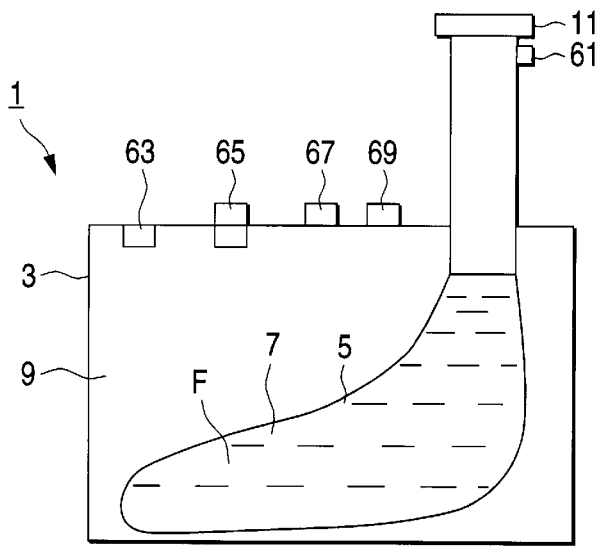
FIG. 9 is a block diagram showing the third embodiment of the present invention.
Figure 10:
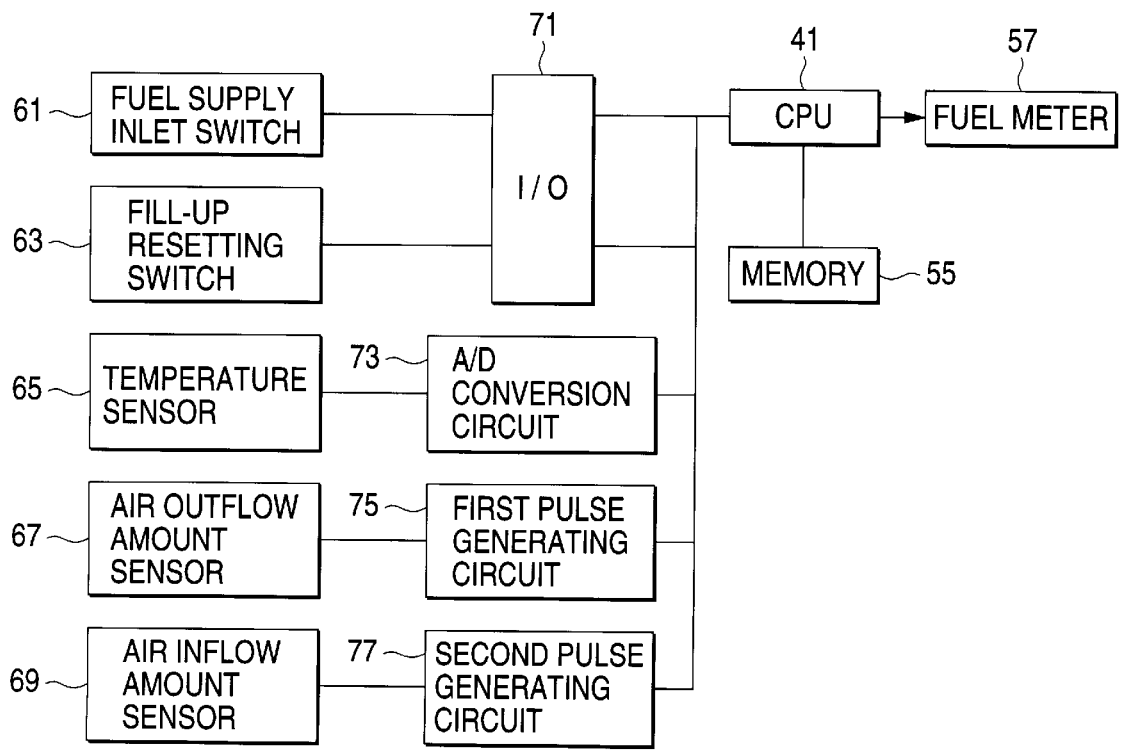
FIG. 10 is a block diagram of a controller in the third embodiment.
Figure 11:
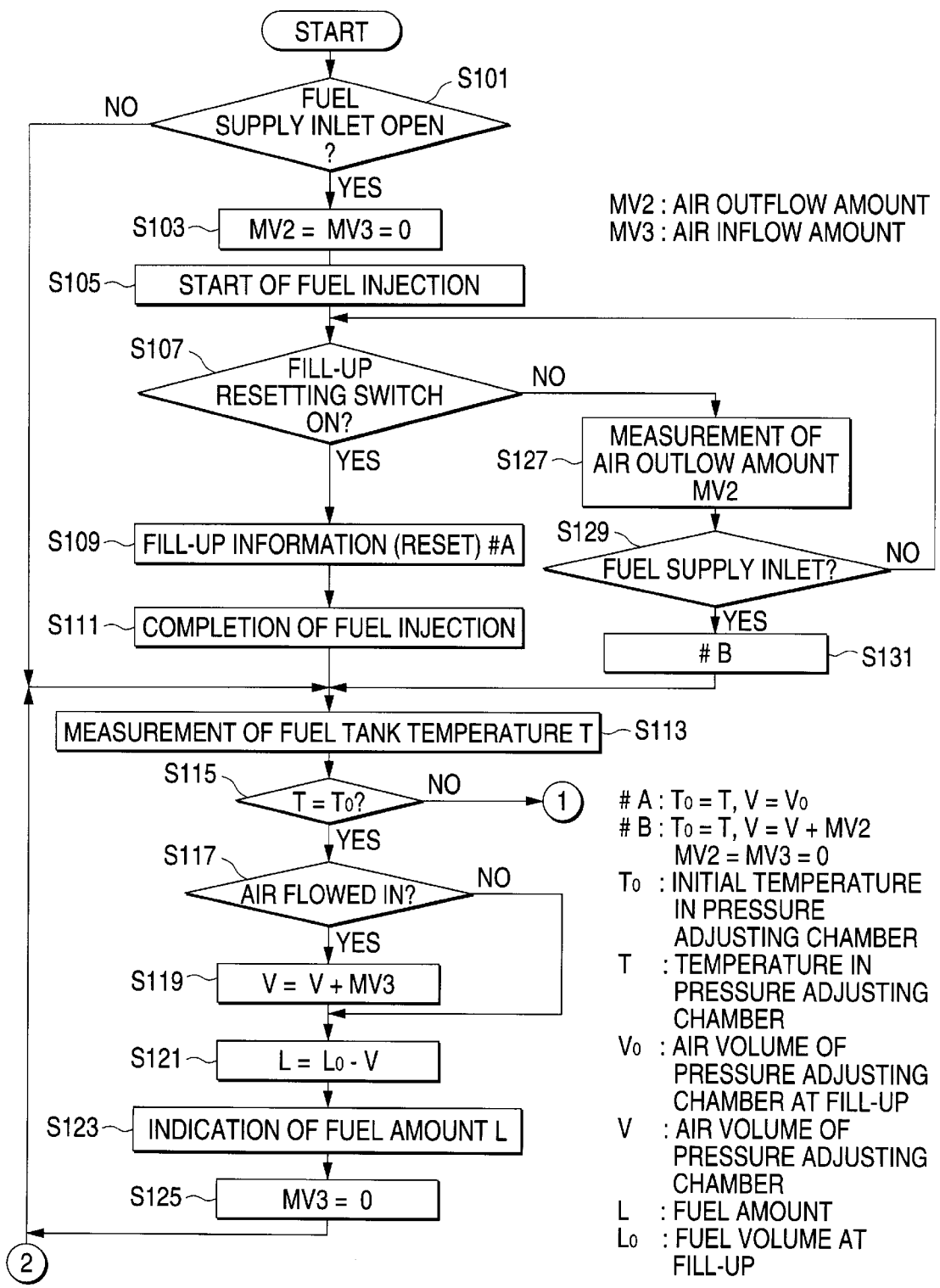
FIG. 11 is a flowchart for explaining the operation of the third embodiment of the present invention.
Figure 12:
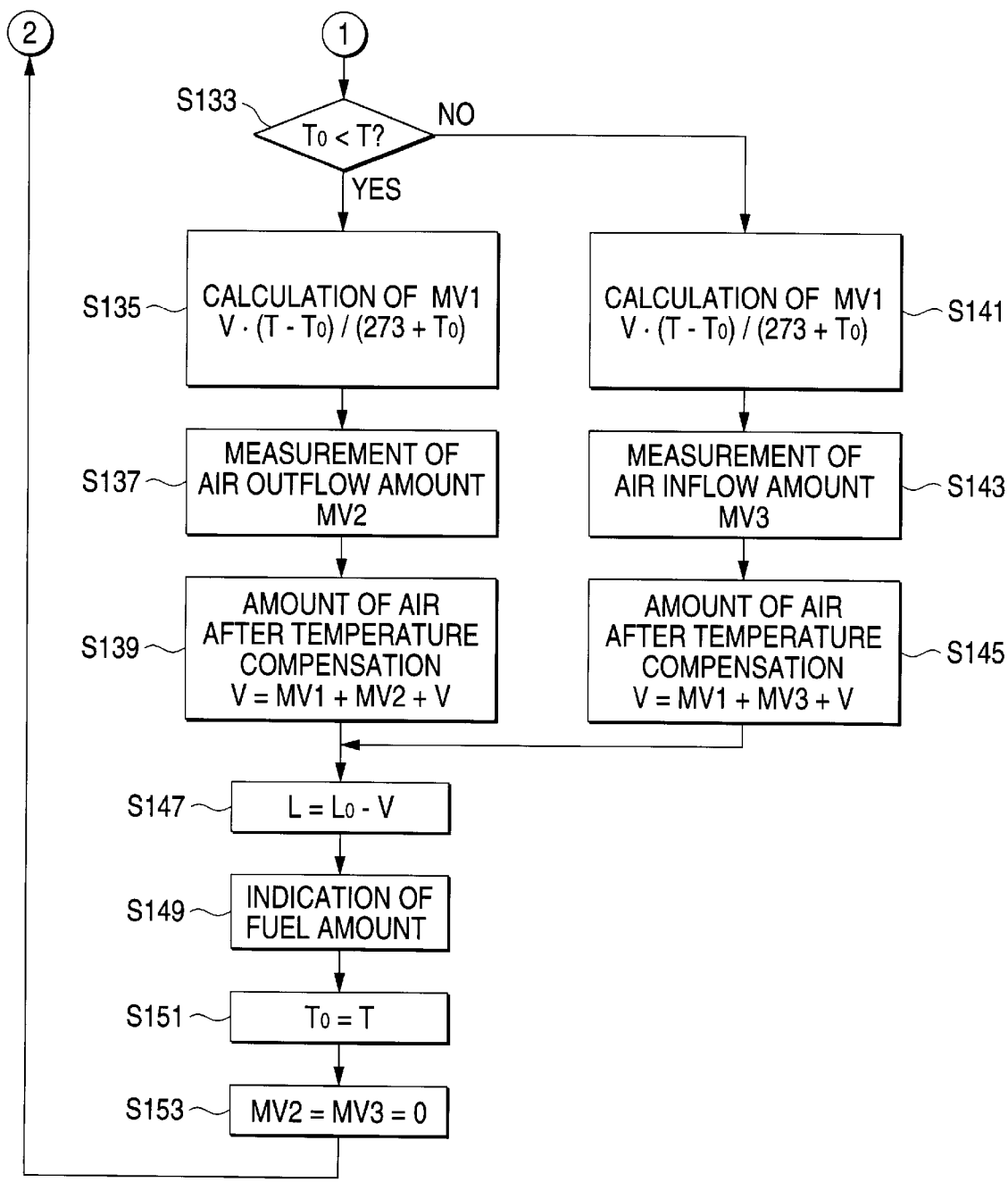
FIG. 12 is a flowchart for explaining the operation of a third embodiment of the present invention.
Figure 13:
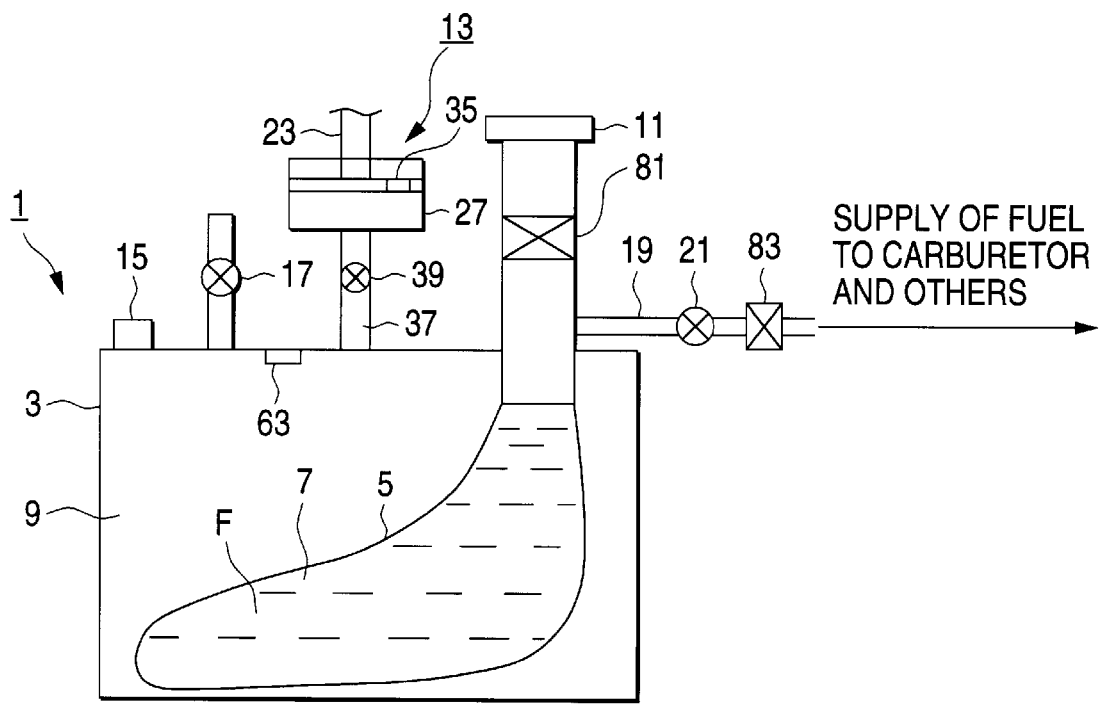
FIG. 13 is a block diagram showing a fourth embodiment of the present invention.
Figure 14:
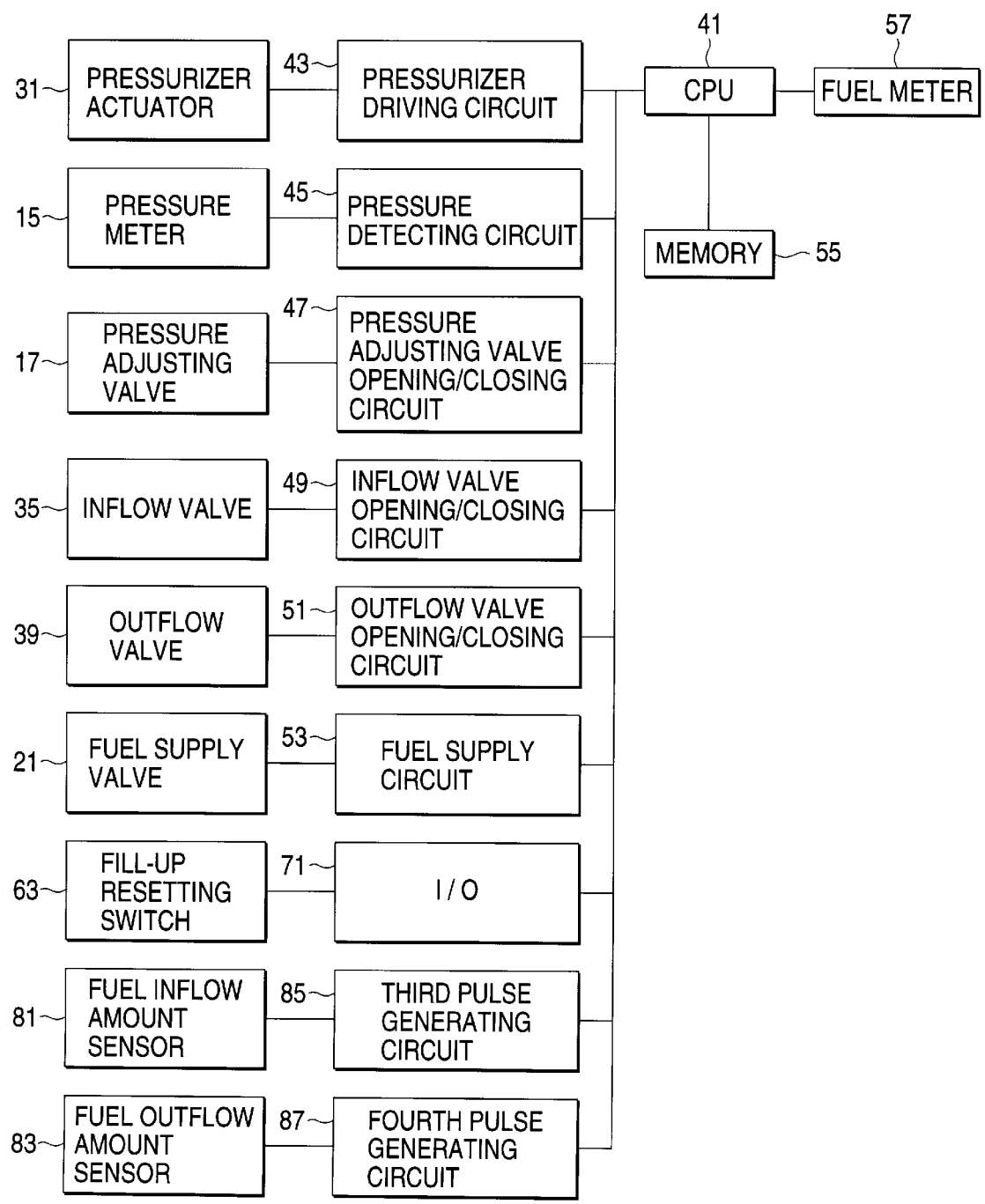
FIG. 14 is a block diagram showing a controller according to a fourth embodiment of the present invention.
Figure 15:
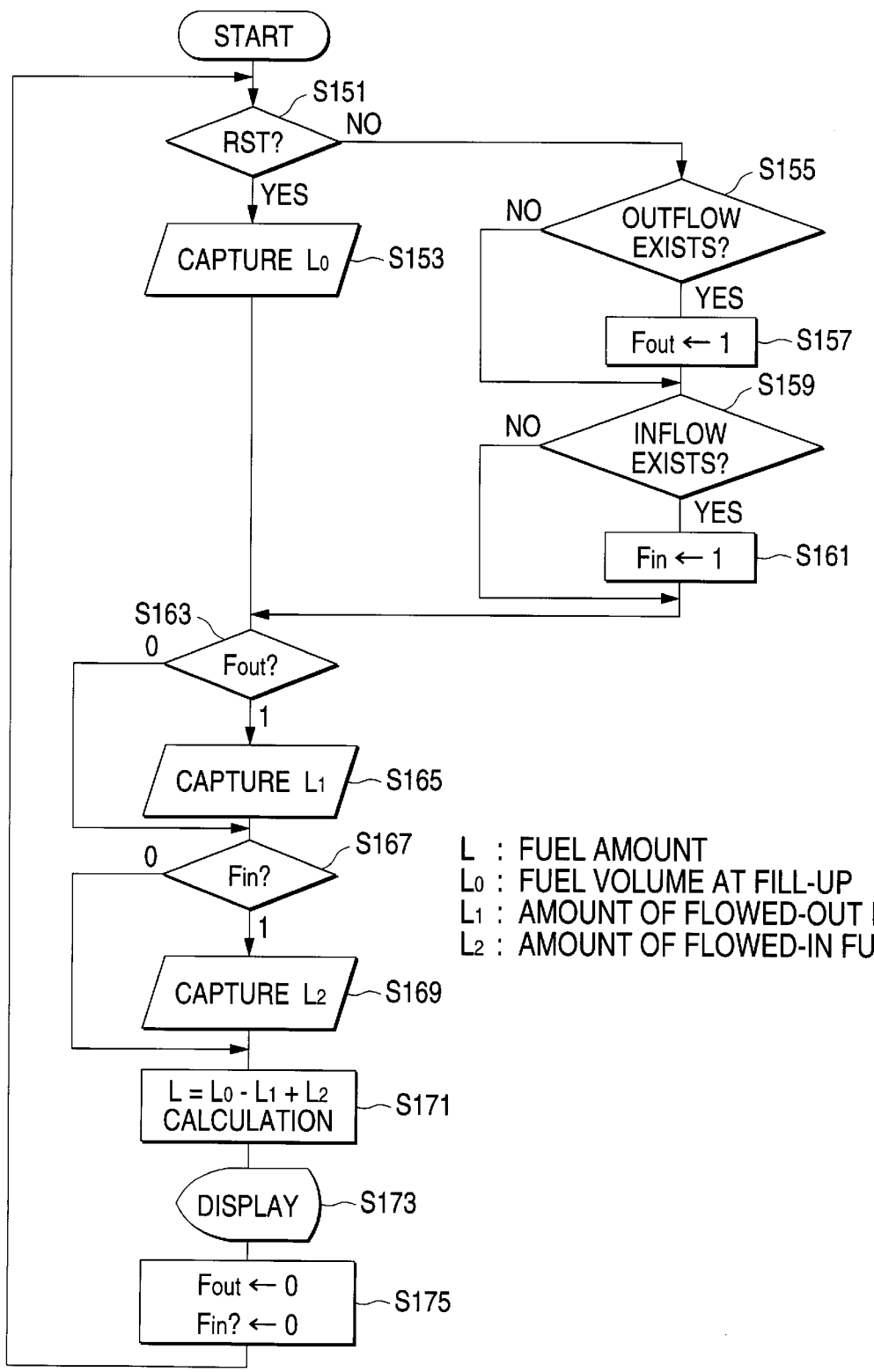
FIG. 15 is a flowchart for explaining the operation of the fourth embodiment of the present invention.

FIG. 1 is a block diagram of the remaining fuel amount measuring apparatus for a fuel tank according to a first embodiment of the present invention. FIG. 2 is a partially enlarged view of the first embodiment. FIG. 3 is a block diagram showing a controller in the first embodiment of the present invention. FIG. 4 is a flowchart for explaining the operation of the first embodiment. FIG. 5 is a block diagram showing a controller in a second embodiment of the present invention. FIG. 6 is a flowchart for explaining the operation in the second embodiment. FIGS. 7 and 8 are schematic views for explaining the fuel tank according to the present invention. FIG. 9 is a block diagram showing the third embodiment of the present invention. FIG. 10 is a block diagram of a controller in the third embodiment. FIGS. 11 and 12 are flowcharts for explaining the operation of the third embodiment of the present invention. FIG. 13 is a block diagram showing a fourth embodiment of the present invention. FIG. 14 is a block diagram showing a controller in the fourth embodiment of the present invention. FIG. 15 is a flowchart for explaining the operation of the fourth embodiment of the present invention. Incidentally, in the plural embodiments of the present invention, like reference numerals refer to like members for simplification of explanation.

Referring to FIG. 1, the first embodiment of the present invention will be described. As seen from FIG. 1, a fuel tank 1 for a motor vehicle includes a tank body 3 constituting the outer casing of the tank, and a soft sack 5 for accommodating fuel F such as gasoline, disposed in the internal space of the tank body 3 and made of resin such as polypropylene. The sack 5 partitions the internal space of the tank body 3 into a fuel chamber 7 for accommodating fuel and a pressure adjusting chamber 9 communicating with the atmosphere. Thus, the fuel F accommodated in the fuel chamber 7 is segregated from the atmosphere. This intends to suppress the fuel vapor from being generated. The sack 5 is equipped with a fuel supply opening 11 protruding from the upper surface of the tank body 3. As shown in FIGS. 7 and 8, when a small amount of fuel remains within the fuel chamber 7, the sack 5 deflates to decrease the volume of the fuel chamber 7 occupying the internal space of the tank 3, whereas when a large amount of fuel remains within the fuel chamber 7, the sack 5 expands to increase the volume of the fuel chamber 7. In this way, the volume of the fuel chamber 7 occupying the internal space of the tank 3 varies with the remaining fuel amount. Therefore, the volume of the fuel chamber 7, i.e. fuel amount can be acquired by subtracting the volume of the pressure adjusting chamber 9 from the internal volume of the tank body 3. In this first embodiment, the volume of the pressure adjusting chamber 9 can be acquired by application of Boyle's law described later and the remaining fuel is obtained from the above relationship.

The fuel tank 1 further includes a pressurizer assembly 13 which supplies air into the pressure adjusting chamber 9 to enhance the pressure therein, a pressure meter 15 for producing a pressure signal according to the pressure of air within the pressure adjusting chamber 9, a pressure adjusting valve 17 for adjusting the pressure within the pressure adjusting chamber 9 by controlling the outflow of air from the pressure adjusting chamber 9, a fuel supply tube 19 for guiding the fuel F stored in the fuel chamber 7 into a carburetor or fuel jetting apparatus (not shown), and a fuel supply valve 21 located in the fuel supply tube 19 for interrupting or permitting the flow of fuel through the supply tube 19.

As shown in FIGS. 2 and 3, the pressurizer assembly 13 includes a pressurizer 29 composed of a piston 25 and a cylinder 27 with a piston rod 23 fixed centrally on the back thereof, a pressurizer actuator 31 for reciprocatively moving the piston rod 23 axially so as to vary the internal pressure of the cylinder 27, an inflow valve 35 for interrupting or permitting the flow of air through a vent 33 formed in the piston 25, an air flow path 37 between the cylinder 27 and the pressure adjusting chamber 9, and an outflow valve 39 disposed in the air flow path 37 and for interrupting or permitting the flow of air through the flow path 37. The pressurizer 29 enhances the internal pressure of the pressure adjusting chamber 9 to a prescribed value by supplying the required amount of air calculated on the basis of the volume of the pressure adjusting chamber 9 along the procedure described later. Thus, the pressurizer 29 supplies the fuel F stored in the fuel chamber 7 to the carburetor or fuel jetting device through the fuel supply tube 19. The piston 25 is designed to make a reciprocal movement by a prescribed stroke. In such a design, whenever the piston is pressed down once, a prescribed amount of air $\Delta V$ is forcibly supplied into the pressure adjusting chamber 9.

The reason why the amount of air to be supplied into the pressure adjusting chamber 9 is calculated on the basis of the volume of the pressure adjusting chamber 9 is that a constant amount of fuel F is always supplied into the fuel supply tube 19 regardless of the remaining fuel amount. More specifically, basically, in order to supply a constant amount of fuel F into the fuel supply tube 19, the internal pressure of the adjusting chamber 9 must be enhanced to a prescribed pressure. But, the volume of the pressure adjusting chamber 9 varies with the remaining fuel amount, i.e. between the cases where a small amount of fuel remains and where a large amount of fuel remains. In both cases, in order to enhance the internal pressure of the pressure adjusting chamber 9 to a prescribed pressure, it is necessary to calculate a required amount of air to be supplied into the pressure adjusting chamber 9 in accordance with the remaining fuel amount. This amount of air can be calculated by initially acquiring the volume of the pressure adjusting chamber 9 by application of the Boyle's law described later and subsequently acquiring the amount of air necessary to increase the pressure of the space having the volume thus obtained to a prescribed pressure. By supplying the amount of air thus acquired into the pressure adjusting chamber 9, a constant amount of fuel F can be always supplied to the fuel supply tube 19 regardless of the remaining fuel amount.

A control device in the first embodiment of the present invention will next be described. The control device serves to calculate the fuel amount in the fuel chamber 7 and always supply a constant amount of fuel F into the fuel supply tube 19. A CPU (central processing unit) 41 serving as such a control device is connected to a pressurizer driving circuit 43 for transferring the operation state of the pressurizer actuator 31 to the CPU 41 while controlling the drive of the pressurizer actuator 31 on the basis of a command from the CPU 41, a pressure detecting circuit 45 for converting a pressure signal sent from a pressure meter 15 into a digital signal to be transferred to the CPU 41, a pressure adjusting valve opening/closing circuit 47 for controlling the open/close of the pressure adjusting valve 17 on the basis of the command from the CPU 41, an inflow valve opening/closing circuit 47 for controlling the open/close of the inflow valve 35 on the basis of the command from the CPU 41, an outflow valve opening/closing circuit 51 for controlling the open/close of the outflow valve 39 on the basis of the command from the CPU 41, a fuel supply circuit 53 for controlling the open/close of the fuel supply valve 21 on the basis of the command from the CPU 41, a memory 55 composed of an ROM for storing processing programs and a RAM 55 for storing data and other information, and a fuel meter 57 for indicating the fuel amount transferred from the CPU 41.

Now referring to the flowchart of FIG. 4, the operation of the first embodiment of the remaining fuel amount measuring apparatus according to the first embodiment will be described.

A theory of measuring a fuel amount will be explained below. First, prior to measurement of the remaining fuel amount, with the pressure adjusting valve 17 closed to seal the tank body 3, a prescribed amount of air is supplied from the pressurizer 29 into the pressure adjusting chamber 9. Then, although the pressure within the pressure adjusting chamber 9 is increased, on the basis of the Boyle's law, the increasing coefficient of the pressure before and after air supply is inversely proportional to the volume V of the pressure adjusting chamber 9. This relationship can be expressed by $$P1 \cdot V = P2 \cdot (V - \Delta V)$$

$$V = (-P2/(P1-P2)) \cdot \Delta V \tag{1}$$

where

P1: pressure before air supply (air pressure)

P2: pressure after air supply $\Delta V$: volume of air supplied under the air pressure, i.e. amount of air.

If pressure before and after air supply can be known, from this equation, the volume V of the pressure adjusting chamber 9 can be acquired. By subtracting the volume V of the pressure adjusting chamber 9, i.e. the amount of air from the internal volume of the tank body 3, the volume of the fuel chamber 7, i.e., the fuel amount can be acquired.

Based on the above measurement theory, the operation of the first embodiment will be explained. First, the CPU 41 issues commands to the fuel supply circuit 53, pressure adjusting valve opening/closing circuit 47, outflow opening/closing circuit 51 and inflow opening/closing circuit 35, respectively to close the fuel supply valve 21 and inflow valve 35 and also open the pressure adjusting valve 17 and outflow valve 39 (Steps S1 to S7). When these valves are closed or opened in Steps S1 to S7, the CPU 1 receives the pressure signal in a digital form from the pressure detecting circuit 45 to acquire the pressure P1 in the pressure adjusting chamber 9 and stores the pressure P1 in the memory 55 (Step 9). The pressure P1 thus acquired is equal to the air pressure because the pressure adjusting valve 17 is opened and the pressure adjusting chamber 9 is communicated with the atmosphere.

The CPU 41 receives the operation state of the pressurizer actuator 31 through the pressurizer driving circuit 43 to decide whether or not the piston 25 lies at a lower dead point (Step S1). If the piston 25 does not lie at the lower dead point, the CPU 41 actuates the pressurizer actuator 31 through the pressurizer driving circuit 43 to move the piston 25 towards the lower dead point (Step S13). Then, the amount $\Delta V$ of air discharged by pressing down the piston 25 once is forcibly supplied into the pressure adjusting chamber 9. The amount $\Delta V$ of air is preset for a suitable value taking the volume of the tank body 3 and others into consideration.

When the air supply in step S13 is completed and the piston 25 is decided to lie at the lower dead point, the CPU 41 receives the pressure signal in a digital form from the pressure detecting circuit 45 to acquire the pressure P2 in the pressure adjusting chamber 9 after air supply and stores the pressure P2 in the memory 55 (Step S15). Subsequently, the CPU 41 reads, from the memory 55, the pressures P1 and P2 in the pressure adjusting chamber 9 before and after the air supply to calculate the fuel amount from the above Equation (1) on the basis of the measurement theory of the fuel amount (S17). Using the procedure described above, the CPU 41 acquires, from the value of the fuel amount thus calculated, the amount of air necessary to increase the pressure in the pressure adjusting chamber 9 to a prescribed value. By dividing the necessary amount of air by the unit amount $\Delta V$ of air discharged when the piston 25 is once pressed down, the CPU 41 acquires the number of times N of pumping of the piston 25.

When the operation of the number of times N of pumping in step S19 is completed, the CPU 41 decides whether or not the number of times of pumping of the piston 25 has reached N times (step S21). If the number of times of pumping in the piston 25 has not reached N times, the CPU 41 issues commands to the fuel supply circuit 53, pressure adjusting valve opening/closing circuit 47, outflow valve opening/ closing circuit 51 and inflow valve opening/closing circuit 49, respectively to open the fuel supply valve 21 and inflow valve 35 and also close the pressure adjusting valve 17 and outflow valve 39 (Steps S23 to S29). When these valves are closed or opened in Steps S23 to S29, it is decided whether or not the piston 25 lies at an upper dead point (Step S31). If the piston 25 does not lie at the upper dead point, the CPU 41 actuates the pressurizer actuator 31 through the pressurizer driving circuit 43 to move the piston 25 towards the upper dead point (Step S33). Thus, the preparation of pressing down of the piston 25 is completed.

When the preparation of pressing down the piston 25 is completed in step S33 and it is decided that the piston 25 lies at the upper dead point, the CPU 41 issues commands to the fuel supply circuit 53, pressure adjusting valve opening/closing circuit 47, outflow opening/closing circuit 51 and inflow opening/closing circuit 49, respectively to open the fuel supply valve 21 and outflow valve 39 and also close the pressure adjusting valve 17 and inflow valve 35 (Steps S35 to S41). When these valves are closed or opened in Steps S35 to S41, the CPU 41 decides whether or not the piston 25 lies at the lower dead point (Step S43). If the piston 25 does not lie at the lower dead point, the CPU 41 actuates the pressurizer actuator 31 through the pressurizer driving circuit 43 to move the piston 25 towards the lower dead point and supplies the amount $\Delta V$ of air into the pressure adjusting chamber 9 (step S45).

When the air supply in step S45 is completed and it is decided that the piston 25 lies at the lower dead point, the CPU 41 decides again whether or not the number of times of pumping of the piston 25 in step S21 has reached N times. If the number of times of pumping of the piston 25 has not reached N times, the processing from step S21 to S45 will be repeated. On the other hand, in step S21, if the CPU 41 decides that the number of times N of the piston 25 has reached N times, the CPU 41 supplies a command signal to the fuel supply circuit 53 to open the fuel supply valve 21 (step S47). Thus, all the steps of the processing are completed.

In accordance with the first embodiment, a prescribed amount of air is supplied into the pressure adjusting chamber 9 to increase the pressure therein. Then, since the increasing coefficient of the pressure before and after the air supply is inversely proportional to the volume V of the pressure adjusting chamber 9 in accordance with the Boyle's law, the volume V of the pressure adjusting chamber 9 is calculated from pressures within the pressure adjusting chamber 9 before and after the air supply. Further, subtracting the volume of the pressure adjusting chamber 9 from the internal volume of the tank body 3 gives the volume of the fuel chamber 7, i.e. remaining fuel amount.

In the prior art, the liquid face of fuel remaining in the fuel tank is detected by a float and the detected value is converted into a remaining fuel amount. On the other hand, in place of this, in accordance with the first embodiment described above, the fuel amount is acquired on the basis of the volume V of the pressure adjusting chamber 9 which is not affected by the swing of the liquid face of the fuel. Therefore, the value thus obtained, which is not affected by external disturbance such as change in the posture of a vehicle, correctly represents the fuel amount in the fuel tank.

Therefore, the error of the fuel amount due to the posture of the fuel tank, which was generated conventionally, can be removed. In addition, giving a delay to the detected value of the fuel liquid face in order to remove the error of the fuel amount conventionally generated is not required. Further, since the fuel amount is detected regardless of the electric resistance generated by the electric contact between a wiring resistor and a contact arm, the fuel amount in the fuel tank can be measured with quick response and high accuracy for a long term.

Now referring to FIGS. 5 and 6, a second embodiment of a remaining fuel amount measuring apparatus according to the present invention will be described. This embodiment adopts the same measuring theory as in the first embodiment and almost the same apparatus structure, so that a difference therebetween will be described in place of explaining the detailed construction of the second embodiment.

The remaining fuel amount measuring apparatus according to this embodiment does not use the pressure meter 15 and pressure detecting circuit 45. Instead of these members, this embodiment uses a timer 61 and a timer driving circuit 63. Specifically, this embodiment uses the pressure adjusting valve 17 and the pressure valve opening/closing circuit 47 for opening or closing the pressure adjusting valve 17 so as to maintain the pressure within the pressure adjusting chamber 9 at a prescribed pressure by opening the pressure adjusting valve 17 when the pressure within the pressure adjusting chamber 9 reaches the prescribed pressure. In addition, this embodiment uses the timer 61 for measuring the time taken for the pressure within the pressure adjusting chamber 9 to reach from the air pressure to a predetermined pressure, and uses the time driving circuit 63 for sending, to the timer 61, timings of the start and end of time measuring of the timer 61 transferred from the CPU 41 and for transferring the measured time of the timer 61 to the CPU 41.

Referring to the flowchart of FIG. 6, the operation of the second embodiment will be described. First, the CPU 41 issues command signals to the fuel supply circuit 53, pressure adjusting valve opening/closing circuit 47, outflow valve opening/closing circuit 51 and inflow valve opening/closing circuit 49, respectively to close the fuel supply valve 21, pressure adjusting valve 17 and inflow valve 35 and also open the outflow valve 39 (Steps S51 to S57). When these valves are closed or opened in Steps S51 to S57, the CPU 41 monitors the opening/closing state of the pressure adjusting valve 17 through the pressure adjusting opening/closing circuit 47 to decide whether the pressure adjusting valve 17 has been opened (Step S59). If the pressure adjusting valve 17 has not been opened, the CPU 41 operates the pressurizer actuator 31 through the pressurizer driving circuit 43 to move the piston 25 towards the lower dead point (Step S61). Thus, the amount $\Delta V$ of air discharged by pressing down the piston 25 once is forcibly supplied into the pressure adjusting chamber 9. Further, the CPU 41, after having started the time measuring of the timer 61 through the timer driving circuit 63 (step S63), decides again whether or not the pressure adjusting valve 17 has been opened in step S59, and the processing from steps S59 to S63 is repeated until the pressure adjusting valve 17 is opened.

When it is decided in step S59 that the pressure adjusting valve 17 has been opened, the CPU 41 completes the time measuring of the timer 61 through the timer driving circuit 63 (step S65) to execute the processing of storing the measured time of the timer 61 in the memory 55. The CPU 41 reads the measured time of the timer 61 taken for the pressure within the pressure adjusting chamber 9 to attain from the air pressure to a prescribed pressure. On the basis of this measured time and a previously obtained amount of discharged air per unit time of the piston 25, the CPU 41 calculates the integrated amount of air supplied into the pressure adjusting chamber 9 until the pressure within the pressure adjusting chamber 9 attains from the air pressure to a prescribed pressure. Further, the CPU 41 reads, from the memory 55, the pressures P1 and P2 within the pressure adjusting chamber 9 before and after the air supply. Based on the measuring theory of the remaining fuel amount, the CPU 41 calculates the volume V of the pressure adjusting chamber 9 from Equation (1) on the basis of the air pressure P1 and prescribed pressure P2 which are pressures before and after the air supply. The CPU 41 subtracts the volume V of the pressure adjusting chamber 9 from the internal volume of the tank body 3 to calculate the volume of the fuel chamber 7, i.e., the fuel amount (step S67).

In the prior art, the liquid face of fuel remaining in the fuel tank is detected by a float and the detected value is converted into a remaining fuel amount. On the other hand, in place of this, in accordance with the second embodiment described above, as in the first embodiment, the fuel amount is acquired on the basis of the volume V of the pressure adjusting chamber 9 which is not affected by the swing of the liquid face of the fuel. Therefore, the value thus obtained, which is not affected by external disturbance such as change in the posture of a vehicle, correctly represents the fuel amount in the fuel tank.

Therefore, the error of the fuel amount due to the posture of the fuel tank, which was generated conventionally, can be removed. In addition, giving a delay to the detected value of the fuel liquid face in order to remove the error of the fuel amount conventionally generated is not required. Further, since the fuel amount is detected regardless of the electric resistance generated by the electric contact between a wiring resistor and a contact arm, the fuel amount in the fuel tank can be measured with quick response and high accuracy for a long term.

In the second embodiment, the integrated amount of air supplied into the pressure adjusting chamber 9 was calculated on the basis of the measured time until the pressure within the pressure adjusting chamber 9 attains from the air pressure to the prescribed pressure, and the fuel amount was calculated from the integrated amount of air. However, the present invention should not be limited to such a construction. For example, the displacement amount in a pressing-down direction of the piston is integrated until the pressure within the pressure adjusting chamber 9 attains from the air pressure to the prescribed pressure. On the basis of the integrated displacement, the fuel amount can be calculated.

Now referring to FIGS. 9 to 12, a third embodiment of a remaining fuel amount measuring apparatus according to the present invention will be described. The fuel tank of the remaining fuel amount measuring apparatus according to the third embodiment has substantially the same structure as that in the first and second embodiments, but is equipped with different members from those of the latter. Thus, the difference between this embodiment and the first and second embodiments will be mainly described below.

As shown in FIG. 9, in the remaining fuel amount measuring apparatus according to the third embodiment, the fuel tank 1 is provided with a fuel supply inlet switch 61 located in the neighborhood of the fuel supply inlet 11 for detecting its open/close state, a full tank resetting switch 63 for detecting whether or not the fuel chamber 5 has been filled up with fuel, a temperature sensor 65 for detecting the temperature within the pressure adjusting chamber 9, an air outflow amount sensor 67 for permitting air to flow out from the pressure adjusting chamber 9 and to detect the amount of air flowed out therefrom, and an air inflow amount sensor 69 for permitting air to flow into the pressure adjusting chamber 9 and to detect the amount of air flowed therein. The full tank resetting switch 63 may be a magnetic proximity switch composed of a magnet to be detected and a detecting element such as a lead switch, Hall element, magnetic resistance element or magnetic coil.

The control apparatus for the third embodiment of the present invention will be described. As shown in FIG. 10, the control device has a CPU 41 serving to calculate the fuel amount stored in the fuel chamber 7 on the basis of the amount of air flowed in and out attendant on consumption or supply of fuel. The CPU 41 is connected to an I/O sensor 71 for converting the signal indicative of the open/close state of the fuel supply inlet 11 detected by the fuel supply switch 61 and the signal indicative of whether the chamber is filled up with the fuel detected by the full tank reset switch 63 into those processable by the CPU 41 so as to be transferred thereto, an A/D converter circuit 73 for converting the analog signal indicative of the temperature of the pressure adjusting chamber 9 detected by the temperature sensor 65 into a digital signal to be transferred to the CPU 41, a first pulse generating circuit 75 for receiving the amount of air flowed out from the pressure adjusting chamber 9 detected by the air outflow sensor 67, generating a single pulse whenever a prescribed amount of air flows out and transferring the generated pulse to the CPU 41, and a second pulse generating circuit 77 for receiving the amount of air flowed into the pressure adjusting chamber 9 detected by the air inflow sensor 69, generating a single pulse whenever a prescribed amount of air flows out and transferring the generated pulse to the CPU 41.

Referring to the flowcharts of FIGS. 11 and 12, the operation of the third embodiment of the present invention will be described. First, the CPU 41 receives the open/close state of the fuel supply inlet through the I/O 71 whether or not the fuel supply inlet 11 is open (step S101). When it is decided that the fuel supply inlet 11 is not open, the CPU 41 jumps the processing process to step S113 described later. When it is decided that the fuel supply inlet 11 is open, the CPU 41 sets the values of the internal registers of the memory 55, i.e., an air outflow register MV2 and an air inflow register MV3 for zero (step S103). After the setting of these registers MV2 and MV3, injection of fuel F is started (step S105). It should be noted that the air outflow register MV2 stores the amount of air flowed out from the pressure adjusting chamber 9 and the value thereof is dealt with as a negative value. Likewise it should be also noted that the air inflow register MV3 stores the amount of air flowed into the pressure adjusting chamber 9 and the value thereof is dealt with as a positive value.

The CPU 41 monitors whether or not the chamber has been filled up with the fuel through the I/O 71 and decides whether or not the full tank reset switch 63 is turned on (step S107). When it is decided that the full tank reset switch has been turned on, i.e. the chamber has been filled up with the fuel, the CPU 41 receives the temperature T within the pressure adjusting chamber 9 through the A/D conversion circuit 73 to set it in an initial temperature register T0, as an internal register of the memory 55, for storing the initial temperature within the pressure adjusting chamber 9. It also sets the volume V0 of air within the pressure adjusting chamber 9 at the time of filling up with the fuel, i.e. zero in an air volume register V, as an internal register of the memory 55, for storing the air volume in the pressure adjusting chamber 9 (step S109). After the values of the registers have been set, the injection of fuel has been completed (step S111). Incidentally, it should be noted that the set values for the initial temperature register T0 and air volume register V are used as filling-up information about the temperature and air volume at the time of filling-up within the pressure adjusting chamber 9.

When the chamber is filled up with the fuel F and setting of the filling-up information is completed, the CPU 41 receives the present temperature T within the pressure adjusting chamber 9 through the A/D conversion circuit 73 and also reads the temperature value stored in the initial temperature register T0 to decide whether or not the present temperature T coincides with the temperature T0 of the initial temperature register (step S115). When the coincidence between T and T0 is decided, the CPU 41 decides through the second pulse generating circuit 77 whether or not air has been flowed into the pressure adjusting chamber 9, i.e. fuel F has been consumed (step 117). When it is decided that air has flowed into the pressure adjusting chamber 9 and the fuel F has been consumed, the CPU 41 captures the amount of air flowed in to update the value of the air inflow register MV3 to this flowed-in amount, and also updates the value of the air volume register V to the value resulting from addition of the set value of the air flowed in register MV3 and the present set value of the air volume register V (step S119). The value of the air volume register V updated by step S119, since the air volume V0 of the pressure adjusting chamber 9 at the time of fuel filling-up is zero, is equal to the set value of the air inflow amount register MV3, i.e. amount of air corresponding to the consumed amount of fuel F. The CPU 41 subtracts, from the fuel volume L0 at the time of fuel filling-up, the value of the air volume register V updated by step S119 to acquire the fuel amount L (step S123). The CPU 41 displays the fuel amount on a fuel meter 57 (step S123). After the processing of display, the CPU 41 sets the air inflow amount register MV3 for zero to return the processing of step S113. The processing from step S113 to S125 is the procedure of calculating the fuel amount where the temperature within the pressure adjusting chamber 9 does not vary from the initial temperature at the time of fuel filling-up so that temperature compensation is not required.

On the other hand, in step S107, when it is decided that the filling-up reset switch 63 has not turned on and the chamber has not been filled up with the fuel, the CPU 41 receives through the first pulse generating circuit 75 the amount of air flowed out from the pressure adjusting chamber 9 and successively updates the value of the air outflow register MV2 by adding the input air outflow value to the existing value of the air outflow register MV2 (step S127). Thus, the value of the air outflow register MV2 updated in step S127 is equal to the amount of air corresponding to the supplied amount of fuel F. The CPU 41 receives the open/close state of the fuel supply inlet 11 through the I/O 71 to decide whether the fuel supply inlet 11 has been closed (step S129). When it is decided that the fuel supply inlet 11 is not closed, the CPU 41 returns the processing to step S107. When it is decided that the fuel supply inlet 11 is closed, i.e., the fuel supply is completed, the CPU 41 receives the temperature T within the pressure adjusting chamber 9 through the A/D conversion circuit 73 to set it in the initial temperature register T0 and updates the value of the air volume register V to the value resulting from addition of the existing air volume V of the pressure adjusting chamber 9 and the value of the air outflow register MV2 updated in step S127. Since the value of the air outflow amount register MV2 is dealt with as a negative value, the updated value of the air volume register V is equal to the air volume of the pressure adjusting chamber 9 after supply of the fuel F. After this updating, the CPU 41 sets the values of the registers MV2 and MV3 for zero (step S131) to advance the processing to step S113. It should be noted that in steps S107 to S131, when the fuel F is supplied by the amount less than the full amount, the supply amount of fuel F required to calculate the fuel amount is acquired in terms of the integrated value of air flowed out from the pressure adjusting chamber 9.

On the other hand, when it is decided in step S115 that the present temperature T does not coincide with the temperature T0 of the initial temperature register, the CPU 41 performs the processing of comparing T with T0 (step S133). When it is decided that T is higher or lower than T0, the CPU 41 performs the temperature compensation processing of steps S135 to S145. Now the reason why the temperature compensation processing is performed will be explained below. On the Charles' law prescribing that the volume of gas such as a certain amount of air varies in proportion to the absolute value under a certain pressure, assuming that the volume within the pressure adjusting chamber 9 is constant, the air volume existing in the pressure adjusting chamber 9 increases or decreases with an increase or decrease in the environmental temperature in the chamber 9. Meanwhile, in the third embodiment, the fuel amount is estimated from the air volume of the pressure adjusting chamber 9 acquired on the basis of the amount of air inflow or outflow for the chamber 9. Therefore, when the amount of air inflow or outflow varies with a change in the temperature in the chamber 9, the amount of variation of air may lead to an error in estimating the remaining fuel amount. Specifically, when the environmental temperature within the pressure adjusting chamber 9 is high, air flows out so that it may be erroneously decided that the fuel F has been supplied. When the above environmental temperature is low, air flows in so that it may be erroneously decided that the fuel F has been consumed. For this reason, in this embodiment, the temperature compensation processing intends to acquire the amount of air of outflow or inflow varying with a change in the temperature in the chamber 9 and excludes the amount of air corresponding to the variation from the air volume of the pressure adjusting chamber 9, thereby preventing generation of the detecting error of the fuel amount due to the environmental temperature in the pressure adjusting chamber 9.

The temperature compensation processing will be explained below for each of two decisions of temperature comparison in step S133. When it is decided that the present temperature T is higher than the temperature of the initial resistor, the CPU 41 calculates, from the state equation of gas based on Charles' law, the changing degree MV1 of the air amount as an ideal value when the environmental temperature within the pressure adjusting chamber 9 rises from T0 to T (step S135). The CPU 41 receives, through the first pulse generating circuit 75, the amount of air flowed out from the chamber 9 and successively updates the value of the air outflow amount register MV2 as an actual value by adding the received air outflow amount to the existing value of the register MV2 (step S137). The CPU 41 calculates the difference of air amount between the ideal value and actual value, i.e. consumed amount of fuel F by adding the value of the register MV2 dealt with as a negative value of actual value to the variation MV1 of the air amount dealt with as a positive value of the ideal value acquired in step S135. The CPU 41 adds the existing value of the air volume register V to the difference and updates the value of the register V to this added value. Thus, the value of the register V updated by step S139 is a value resulting from addition of the existing value of the register V and consumed value of the fuel F. Accordingly, the increase of the air volume of the chamber due to the change in the environmental temperature in the chamber 9 is canceled to acquire the value corresponding to the consumed amount of fuel F.

Likewise, when it is decided that T is lower than T0, the CPU 41 calculates, from the state equation of gas based on Charles' law, the changing degree MV1 of the air amount as an ideal value when the environmental temperature within the pressure adjusting chamber 9 falls from T0 to T (step S41). The CPU 41 receives, through the second pulse generating circuit 75, the amount of air flowed into the chamber 9 and successively updates the value of the air inflow amount register MV3 as an actual value by adding the received air inflow amount to the existing value of the register MV3 (step S143). The CPU 41 calculates the difference of air amount between the ideal value and actual value, i.e. consumed amount of fuel F by adding the value of the register MV3 dealt with as a positive value of actual value to the variation MV1 of the air amount dealt with as a negative value of the ideal value acquired in step S141. The CPU 41 adds the existing value of the air volume register V to the above difference and updates the value of the register V to this added value (step S145). Thus, as described above, the value of the register V updated by step S145 is a value resulting from addition of the existing value of the register V and consumed value of the fuel F. Accordingly, the decrease of the air volume of the chamber due to the change in the environmental temperature in the chamber 9 is canceled to acquire the value corresponding to the consumed amount of fuel F.

In step S139 or S145, when the value of the air volume register V is updated, the CPU 41 subtracts, from the fuel volume L0 at the time of fuel filling-up, the value of the air volume register V updated in step S139 or S145 to acquire the fuel amount L (step S147). The CPU 41 displays the fuel amount on a fuel meter 57 (step S123). After the processing of display, the CPU 141 updates T0 to T (step 151). Thereafter, the CPU 41 sets the air outflow register MV2 and the air inflow register MV3 for zero to return to the processing of step S113. When the environmental temperature within the pressure adjusting chamber 9 varies from the initial temperature at the time of filling-up, the processing from step S133 to S153 cancels the variation in the air volume of the chamber due to the temperature change and also acquire the value corresponding to the consumed amount of fuel F.

In accordance with the third embodiment, the air volume of the pressure adjusting chamber 9 is calculated from the integrated air flowed in and out from the pressure adjusting chamber 9 and the fuel amount is estimated on the basis of the air volume. In addition, when the environmental temperature within the chamber 9 varies, the variation of the amount of air flowed in or out due to the temperature change is calculated. The air amount corresponding to the variation is excluded from the air volume of the chamber 9 to cancel the variation in the air volume due to the environmental temperature within the chamber 9, thereby acquiring the fuel amount with high accuracy.

In the prior art, the liquid face of fuel remaining in is the fuel tank is detected by a float and the detected value is converted into a remaining fuel amount. On the other hand, in place of this, in accordance with the third embodiment described above, the fuel amount is acquired on the basis of the volume of air in the pressure adjusting chamber 9 which is not affected by the swing of the liquid face of the fuel. Therefore, the value thus obtained, which is not affected by external disturbance such as a change in the posture of a vehicle, correctly represents the fuel amount in the fuel tank.

Therefore, the error of the fuel amount due to the posture of the fuel tank, which was generated conventionally, can be removed. In addition, giving a delay to the detected value of the fuel liquid face in order to remove the error of the fuel amount conventionally generated is not required. Further, since the fuel amount is detected regardless of the electric resistance generated by the electric contact between a wiring resistor and a contact arm, the fuel amount in the fuel tank can be measured with quick response and high accuracy for a long term.

In the third embodiment, although sensors for detecting the amount of air flowed in or out from the pressure adjusting chamber 9 were individually provided for the air outflow and inflow, a single sensor may be designed to detect both amounts of air inflow and outflow for the chamber 9.

Now referring to FIGS. 13 to 15, a fourth embodiment of a remaining fuel amount measuring apparatus according to the present invention will be described. The fuel tank of the remaining fuel amount measuring apparatus according to the fourth embodiment has substantially the same structure as that in the first embodiment, but is provided with other members. The provision of the other members will be mainly explained.

The remaining fuel amount measuring apparatus according to the fourth embodiment includes, as shown in FIGS. 13 and 14, there is provided a fuel inflow amount sensor 81 located in the neighborhood of the fuel supply inlet of the sack 5 for detecting the amount L2 of fuel F flowed into the fuel chamber 7 during fuel supply. On the downstream side of the fuel supply valve 21 in the fuel supply tube 19, a fuel outflow amount sensor 83 is provided to detect the amount of fuel flowed out from the fuel chamber 7 in consumption of the fuel. The fuel inflow and outflow sensors 81 and 83 may be an elliptical gear type flow rate sensor exhibiting the number of rotations corresponding to the amount L1 and L2 of outflow and inflow of the fuel F. The number of rotations are converted into a pulse signal by a pulse generating circuit described later so that the pulse signals according to the amounts L1 and L2 of outflow and inflow of fuel F are transferred to the CPU 41. The tank body 3, as in the third embodiment of the present invention, is provided with a full tank reset switch 63 for detecting whether or not the fuel chamber 5 has been filled up with the fuel.

The structure of the control device in the fourth embodiment will be described. As shown in FIG. 14, in addition to the members of the control device of the first embodiment, this control device further includes an I/O 71 for converting the signal, which is detected by the full tank reset switch 63 and is indicative of whether or not the chamber has been filled up with the fuel, into a signal processable by the CPU 41 and transferring the converted signal to the CPU 41, a third pulse generating circuit 85 for transferring, to the CPU 41, the pulse signal corresponding to the inflow amount of fuel L2 detected by the fuel inflow amount sensor 81, and a fourth pulse generating circuit 87 for transferring, to the CPU 41, the pulse signal corresponding to the outflow amount L1 of fuel F detected by the fuel outflow amount sensor 83. Both fuel amounts L1 and L2 are accumulatively stored in an internal register of the memory. The contents of memory are reset to zero whenever the state of filling-up with fuel is detected by the full tank reset switch 63.

Referring to the flow-chart of FIG. 15, the operation of the fourth embodiment will be described. First, the CPU 41 monitors the state of the full tank reset switch 63 through the I/O 71 to decide whether or not a full tank reset switch signal RST has been inputted, i.e. the chamber is filled up with the fuel F (step S151). When it is decided that the full tank reset signal RST has been inputted, the CPU 41 captures the fuel amount L0 at the time of filling-up from the memory 55

(step S153). The CPU 41 resets L2 and L1, which have been detected by the fuel inflow amount sensor 81 and the fuel outflow sensor 83 and accumulatively stored in the memory 55, at the time of inputting the full tank reset signal RST, to zero. Specifically, the memory 55 stores, at prescribed addresses of the corresponding areas, the accumulative values of the inflow amounts L3 and L2 of fuel detected by the fuel inflow amount sensor 81 and the fuel outflow amount sensor 83 since the time of inputting the full tank reset signal RST, respectively, and cancels the memory contents when the full tank reset signal is inputted.

On the other hand, when it is decided in step S151 that the full tank reset signal RST has not been inputted, i.e. the fuel F has not been fully injected, the CPU 141 decides whether or not the outflow amount signal has been inputted from the fuel outflow amount sensor 83 (step S155). When it is decided that the fuel outflow amount signal has been inputted, the CPU 41 sets a bit of an outflow flag Fout (step S157). The contents of the flag Fout is used as a branching condition for deciding whether the fuel outflow amount L1 should be captured from the fuel chamber 5. On the other hand, when it is decided in step S155 that the outflow amount signal has not been inputted, the CPU 41 jumps the processing of step S157 to the subsequent processing.

After it is decided in step S155 that the outflow signal has not been inputted or in step S157, the outflow flag Fout has been set, the CPU 41 decides whether or not the inflow signal has been inputted from the fuel inflow amount sensor 81 (step S159). When it is decided that the inflow amount signal has been inputted, the CPU 41 sets a bit of an inflow flag Fin (step S161). The contents of the flag Fin is used as a branching condition for deciding whether the fuel inflow amount L2 to the fuel chamber 5 should be captured into the CPU 41. On the other hand, when it is decided in step S159 that the inflow amount signal has not been inputted, the CPU 41 jumps the processing of step S161 to the subsequent processing.

After the fuel volume L0 at the time of filling-up has been captured from the memory 55 in step S153, after it is decided in step S159 that the inflow amount signal has not been inputted, or after the bit of the inflow flag Fin has been set in step S161, the CPU 41 decides whether or not the bit of the outflow flag Fout has been set (step S163). When it is decided that the bit of the outflow flag Fout has been set, the CPU 41 takes in the fuel outflow amount L1 from the memory 55 since the input time of the full tank reset signal RST. On the other hand, when it is decided in step S163 that the bit of the outflow Fout signal has not been set, the CPU 41 jumps the processing of step S165 to the subsequent processing.

When it is decided in step S163 that the bit of the outflow flag Fout has not been set, or in S165 the fuel outflow amount L1 has been captured, the CPU 41 decides whether or not the bit of the inflow flag Fin has been set (step S167). When it is decided that the bit of the inflow flag Fin has been set, the CPU 41 captures the fuel inflow amount L2 from the memory 5 since the input time of the full tank reset signal RST (step S169). On the other hand, when it is decided in step S163 that the bit of the inflow Fin signal has not been set, the CPU 41 jumps the processing of step S169 to the subsequent processing.

After it is decided that the bit of the inflow flag Fin has not been set in step S167 or the inflow amount L2 has been captured in step S169, the CPU 41 executes the operation of "L0 −L1+L2" that the fuel outflow amount L1 is subtracted from the fuel volume L0 at the time of filling-up and the fuel inflow amount L2 is added thereto, thus acquiring the fuel amount L (step S171). In other words, with a reference value of the fuel volume L0 at the time of filling-up, the fuel outflow amount L1 is subtracted therefrom when the fuel has flowed out from the fuel chamber 5, and the fuel inflow amount L2 is added thereto when the fuel has flowed in the fuel chamber 5. The operation result in step S171 correctly represents the present fuel amount without being affected by external disturbance such as a change in the posture of a vehicle. In addition, since the operation in step S171 is repeated at a predetermined cycle time, the fuel amount of the chamber 5 which can be varied continuously for each processing cycle can be measured with quick response.

After the arithmetic processing in step S171 has been completed, the CPU 41 executes an instruction of displaying the arithmetic result in step S171 on the fuel meter 57 (step S173). Thereafter, the CPU 41 sets the bits of the inflow flag Fin and outflow flag Fout to zero, respectively (step S175). Thereafter, the CPU 41 returns the processing to step S151 and repeats the processing from step S151 to step S175.

In accordance with the fourth embodiment, with a reference value of the fuel volume at the time of filling-up, the fuel outflow amount is subtracted therefrom and the fuel inflow amount is added thereto, thus acquiring the fuel amount on the basis of the actual fuel outflow/inflow amounts.

In the prior art, the liquid face of fuel remaining in the fuel tank is detected by a float and the detected value is converted into a remaining fuel amount. On the other hand, in place of this, in accordance with the fourth embodiment described above, the fuel amount is acquired on the basis of the actual fuel inflow/outflow amounts which are not affected by the swing of the liquid face of the fuel. Therefore, the value thus obtained, which is not affected by external disturbance such as change in the posture of a vehicle, correctly reproduces the fuel amount in the fuel tank.

Therefore, the error of the fuel amount due to the posture of the fuel tank, which was generated conventionally, can be removed. In addition, giving a delay to the detected value of the fuel liquid face in order to remove the error of the fuel amount conventionally generated is not required. Further, since the fuel amount is detected regardless of the electric resistance generated by the electric contact between a wiring resistor and a contact arm, the fuel amount in the fuel tank can be measured with quick response and high accuracy for a long term.

In accordance with the forth embodiment, the remaining fuel amount is acquired by subtraction/addition of the actual fuel inflow/outflow amounts for the fuel volume at the time of filling-up, the measuring accuracy is very high. Therefore, the fourth embodiment can be combined with the first to third embodiments, respectively and the fuel amount obtained in the fourth embodiment can be used as a reference value for calibration so that the measuring accuracy can be further improved.

Finally, in the several embodiments described above, as a fuel tank in the fuel amount measuring apparatus according to the present invention, the fuel tank of a motor vehicle equipped with an internal combustion engine was illustrated. The present invention, however, should not be limited to such a fuel tank, but can be applied to a wide area of applications inclusive of the fuel tank of an aircraft with an internal combustion engine, agricultural implements such as a tractor equipped with an internal combustion engine, etc.

According to the invention of the first aspect, the fuel amount is acquired on the basis of the parameter about air which is not affected by the swing of the liquid face of the fuel. Therefore, the value thus obtained, which is not affected by external disturbance such as change in the posture of a vehicle, correctly reproduces the fuel amount in the fuel tank.

Therefore, the error of the fuel amount due to the style of the fuel tank, which was generated conventionally, can be removed. In addition, giving a delay to the detected value of the fuel liquid face in order to remove the error of the fuel amount conventionally generated is not required. Further, since the fuel amount is detected regardless of the electric resistance generated by the electric contact between a wiring resistor and a contact arm, the fuel amount in the fuel tank can be measured with quick response and high accuracy for a long term.

According to the invention of the second aspect, the fuel amount is acquired on the basis of the amount of air existing in the pressure adjusting chamber which is not affected by the swing of the liquid face of the fuel. Therefore, the value thus obtained, which is not affected by external disturbance such as a change in the posture of a vehicle, correctly reproduces the fuel amount in the fuel tank.

Therefore, the error of the fuel amount due to the change in the posture of the fuel tank, which was generated conventionally when the liquid face of fuel remaining in the fuel tank is detected by a float, can be removed. In addition, giving a delay to the detected value of the fuel liquid face in order to remove the error of the fuel amount conventionally generated is not required. Further, since the fuel amount is detected regardless of the electric resistance generated by the electric contact between a wiring resistor and a contact arm, the fuel amount in the fuel tank can be measured with quick response and high accuracy for a long term.

According to the invention of the third aspect, as in the invention of the second aspect, the fuel amount is acquired on the basis of the amount of air existing within the pressure adjusting chamber which is not affected by the swing of the liquid face of the fuel. Therefore, the value thus obtained, which is not affected by external disturbance such as a change in the posture of a vehicle, correctly reproduces the fuel amount in the fuel tank.

Therefore, the error of the fuel amount due to the change in the posture of the fuel tank, which was generated conventionally when the liquid face of fuel remaining in the fuel tank is detected by a float, can be removed. In addition, giving a delay to the detected value of the fuel liquid face in order to remove the error of the fuel amount conventionally generated is not required. Further, since the fuel amount is detected regardless of the electric resistance generated by the electric contact between a wiring resistor and a contact arm, the fuel amount in the fuel tank can be measured with quick response and high accuracy for a long term.

According to the invention of the fourth aspect, even when the environmental temperature within the pressure adjusting chamber changes, a correcting means makes correction of excluding the variation in the amount of air flowed in/out attendant on the temperature change from the amount of air in the pressure adjusting chamber so that the variation of the air amount of the pressure adjusting chamber due to the change in the environmental temperature in the pressure adjusting chamber is canceled, thus giving an advantage of acquiring the fuel amount with high accuracy.

What is claimed is:

1. An apparatus for measuring an amount of fuel remaining in a fuel tank having a tank body partitioned, in an internal space of the fuel tank, into a fuel chamber accommodating the fuel and a pressure adjusting chamber communicating with the atmosphere which does not accommodate the fuel, said apparatus measuring the remaining fuel amount in the fuel chamber and comprising:

parameter detecting means for detecting a parameter relative to air existing in said pressure adjusting chamber; and calculating means for calculating the amount of fuel remaining in said fuel detected by the parameter detecting means.

2. An apparatus for measuring an amount of fuel remaining in a fuel tank according to claim 1, further comprising:

air amount calculating means for calculating an amount of air existing in said pressure adjusting chamber;

temperature detecting means for detecting an environmental temperature within said pressure adjusting chamber; and correcting means for correcting a calculated result of said air amount calculating means on the basis of the environmental temperature within said pressure chamber detected by said temperature detecting means.

3. An apparatus for measuring an amount of fuel remaining in a fuel tank according to claim 1, wherein said fuel chamber is separated from said pressure adjusting chamber by a separation membrane, wherein said separation membrane is pliable.

4. An apparatus for measuring an amount of fuel remaining in a fuel tank according to claim 3, wherein said separation membrane is sack-shaped, so that said fuel chamber has a variable shape and volume depending on the amount of fuel remaining in said fuel chamber.

5. An apparatus for measuring an amount of fuel remaining in a fuel tank according to claim 1, wherein said fuel chamber expands and contracts according to the amount of remaining fuel.

6. An apparatus for measuring an amount of fuel remaining in a fuel tank having a tank body partitioned, in an internal space of the fuel tank, into a fuel chamber accommodating the fuel and a pressure adjusting chamber communicating with the atmosphere which does not accommodate the fuel, said apparatus measuring the remaining fuel amount in the fuel chamber and comprising:

sealing means for sealing an outflow of air from said tank body;

air supply means for supplying a required amount of air into said pressure adjusting chamber in a state where the outflow of air is sealed by said sealing means;

pressure detecting means for detecting pressures within said pressure adjusting chamber before and after air supply by said air supply means, respectively;

storage means for storing detected pressure values of said pressure detecting means within said pressure adjusting chamber before and after the air supply;

air amount calculating means for reading said detected pressure values from said pressure storage means to calculate an amount of air existing in said pressure adjusting chamber on the basis of said detected pressure values and said required air amount; and remaining fuel amount estimating means for estimating the remaining fuel amount in said fuel chamber on the basis of the air amount calculated by said air amount calculating means.

7. An apparatus for measuring an amount of fuel remaining in a fuel tank according to claim 6, wherein said fuel chamber expands and contracts according to the amount of remaining fuel.

8. An apparatus for measuring an amount of fuel remaining in a fuel tank according to claim 6, further comprising:

temperature detecting means for detecting an environmental temperature within said pressure adjusting chamber; and correcting means for correcting a calculated result of said air amount calculating means on the basis of the environmental temperature within said pressure chamber detected by said temperature detecting means.

9. An apparatus for measuring an amount of fuel remaining in a fuel tank according to claim 6, wherein said fuel chamber is separated from said pressure adjusting chamber by a separation membrane, wherein said separation membrane is pliable.

10. An apparatus for measuring an amount of fuel remaining in a fuel tank according to claim 9, wherein said separation membrane is sack-shaped, so that said fuel chamber has a variable shape and volume depending on the amount of fuel remaining in said fuel chamber.

11. An apparatus for measuring an amount of fuel remaining in a fuel tank having a tank body partitioned, in an internal space of the fuel tank, into a fuel chamber accommodating the fuel and a pressure adjusting chamber communicating with the atmosphere, said apparatus measuring the remaining fuel amount in the fuel chamber and comprising:

air amount storage means for storing an amount of air existing in said pressure adjusting chamber at a reference time when a prescribed amount of fuel remains within said fuel chamber;

air outflow amount detecting means for accumulatively detecting an amount of air flowed out from said tank body since the reference time;

air inflow amount detecting means for accumulatively detecting an amount of air flowed into said tank body since the reference time;

air inflow/outflow amount storage means for storing inflow/outflow air amounts detected by said air outflow amount detecting means and said air inflow amount detecting means;

air amount calculating means for reading said air amount from said air amount storage means and said inflow/outflow air amounts from said inflow/outflow amount storage means to calculate an amount of air existing in said pressure adjusting chamber on the basis of said air amount and said inflow/outflow air amounts; and remaining fuel amount estimating means for estimating the remaining fuel amount in said fuel chamber on the basis of the air amount calculated by said air amount calculating means.

12. An apparatus for measuring an amount of fuel remaining in a fuel tank according to claim 11, further comprising:

temperature detecting means for detecting an environmental temperature within said pressure adjusting chamber; and correcting means for correcting a calculated result of said air amount calculating means on the basis of the environmental temperature within said pressure chamber detected by said temperature detecting means.

13. An apparatus for measuring an amount of fuel remaining in a fuel tank according to claim 11, wherein said fuel chamber is separated from said pressure adjusting chamber by a separation membrane.

14. An apparatus for measuring an amount of fuel remaining in a fuel tank according to claim 13, wherein said separation membrane is sack-shaped.

* * * * *